US007053375B2

(12) United States Patent
Ando et al.

(10) Patent No.: US 7,053,375 B2
(45) Date of Patent: May 30, 2006

(54) SCINTILLATOR INCLUDING A GROUP III NITRIDE COMPOUND SEMICONDUCTOR AND A SCINTILLATION COUNTER INCLUDING A SCINTILLATOR INCLUDING A GROUP III NITRIDE COMPOUND SEMICONDUCTOR

(75) Inventors: Masanobu Ando, Aichi (JP); Katsuhisa Sawazaki, Aichi (JP); Masaaki Nakayama, Nara (JP)

(73) Assignee: Toyoda Gosei Co., Ltd., Aichi (JP)

(*) Notice: Subject to any disclaimer, the term of this patent is extended or adjusted under 35 U.S.C. 154(b) by 121 days.

(21) Appl. No.: 10/627,983

(22) Filed: Jul. 28, 2003

(65) Prior Publication Data

US 2004/0069950 A1 Apr. 15, 2004

(30) Foreign Application Priority Data

Jul. 29, 2002 (JP) ........................... P2002-219542

(51) Int. Cl.

*G01T 1/20* (2006.01)
*C09K 11/08* (2006.01)
*H01L 29/20* (2006.01)
*H01L 31/0304* (2006.01)
*H01L 31/0328* (2006.01)

(52) U.S. Cl. ............................. 250/361 R; 250/483.1; 252/301.4 R; 257/201; 257/615

(58) Field of Classification Search ............ 250/361 R, 250/369, 370.01, 370.11, 370.12, 370.14, 250/483.1; 252/301.4 R; 257/615, 201
See application file for complete search history.

(56) References Cited

U.S. PATENT DOCUMENTS 3,027,329 A * 3/1962 Grimmeiss et al. ... 252/301.4 R
5,334,840 A * 8/1994 Newacheck et al. ..... 250/483.1
5,523,589 A * 6/1996 Edmond et al. .............. 257/77
5,875,052 A * 2/1999 Shmagin et al. ............ 359/244
6,064,078 A * 5/2000 Northrup et al. ............. 257/96
6,140,669 A * 10/2000 Lozykowski et al. ....... 257/103

FOREIGN PATENT DOCUMENTS

JP 2002141552 A * 5/2002

* cited by examiner

*Primary Examiner*—David Porta
*Assistant Examiner*—Frederick Rosenberger
(74) *Attorney, Agent, or Firm*—McGinn IP Law Group PLLC

(57) ABSTRACT

A scintillator includes a Group III nitride compound semiconductor layer that emits fluorescent light when radiated by, for example, a CU-Kα-ray source, an X-ray source, or a γ-ray source, and a scintillation counter including a scintillator having a Group III nitride compound semiconductor.

13 Claims, 3 Drawing Sheets

30
38
COUNTER CIRCUIT
37
WAVEFORM SHAPING CIRCUIT
36
DISCRIMINATOR
35
PREAMP-LIFIER
33
HIGH VOLTAGE SOURCE
34
32
LIGHT
1
31
RADIATION

SCINTILLATOR INCLUDING A GROUP III NITRIDE COMPOUND SEMICONDUCTOR AND A SCINTILLATION COUNTER INCLUDING A SCINTILLATOR INCLUDING A GROUP III NITRIDE COMPOUND SEMICONDUCTOR

The present application is based on Japanese Patent Application No. 2002-219542, which is incorporated herein by reference.

BACKGROUND OF THE INVENTION

1. Field of the Invention

The present invention relates to a scintillator. The invention can be applied to the field of radiation measurement, radiation non-destructive inspection, radiation medical diagnosis, etc.

2. Description of the Related Art

A scintillation counter is known as a detector for detecting radiation such as γ-rays or X-rays. The scintillation counter has a scintillator. When an electron state in the scintillator is excited by radiation, fluorescence is emitted while the electron state is restored to a ground state. The fluorescence is detected so that the amount of radiation applied on the scintillator is detected.

Accordingly, the characteristics required of the scintillator are (1) high quantum efficiency in an irradiation state, (2) short life of fluorescence, etc.

From the point of view of facilitation of production of crystal, scintillation efficiency, etc., ionic crystal of alkali halide or the like is used as the scintillator. In practice, NaI:Tl or CsI:Tl containing alkali halide such as NaI or CsI, and a fluorescence activator such as Tl added to the alkali halide is generally widely used.

Although the ionic crystal of NaI or CsI has a merit in facilitation of production of crystal, high scintillation efficiency, etc., there is a chemical stability problem that the ionic crystal deliquesces by absorbing water. In addition, because Tl added as a fluorescence activator is a highly toxic substance, there is also a problem that Tl has bad influence on the human body and the environment.

SUMMARY OF THE INVENTION

Therefore, an object of the invention is to provide a scintillator chemically stable and nontoxic in order to overcome the problem of the scintillation material widely put into practical use.

The inventors have made eager examination to obtain an ideal scintillator. As a result, it has been found that the Group III nitride compound semiconductor has the above characteristics, and the invention has been accomplished. That is, a subject of the invention is a scintillator made of a Group III nitride compound semiconductor layer.

DETAILED DESCRIPTION OF THE PREFERRED EMBODIMENTS

Figure 1:
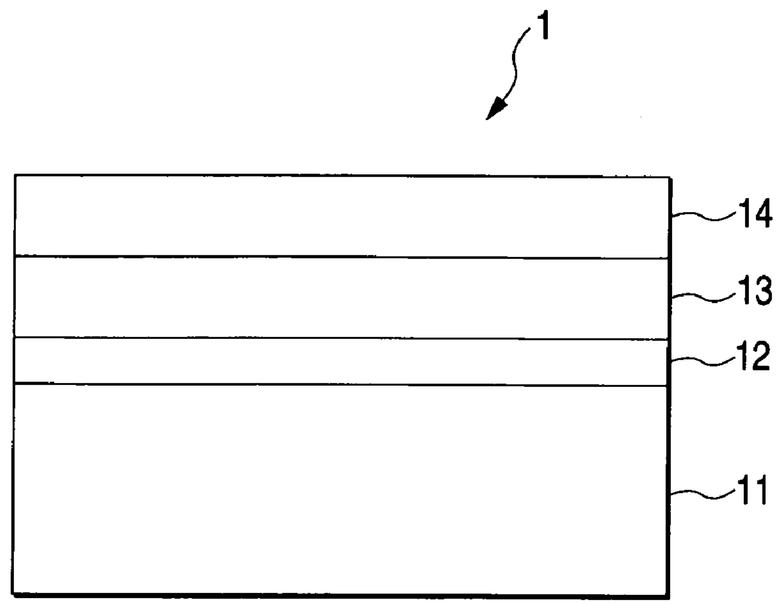
FIG. 1 is a sectional view typically showing a scintillator according to an embodiment of the invention.

The invention will be described below in detail.

In this specification, each of Group III nitride compound semiconductors is represented by the general formula $Al_XGa_YIn_{1-X-Y}N$ ($0 \leqq X \leqq 1$, $0 \leqq Y \leqq 1$, $0 \leqq X+Y \leqq 1$), which includes so-called binary compounds such as AlN, GaN and InN, and so-called ternary compounds such as $Al_xGa_{1-x}N$, $Al_xIn_{1-x}N$ and $Ga_xIn_{1-x}N$ ($0<x<1$ in the above). At last part of the Group III elements may be replaced by boron (B), thallium (Tl), etc. At least part of the nitrogen (N) may be replaced by phosphorus (P) arsenic (As), antimony (Sb), bismuth (Bi), etc. The Group III nitride compound semiconductor layer may contain an optional dopant. Silicon (Si), germanium (Ge), selenium (Se), tellurium (Te), carbon (C) or the like may be used as n-type impurities. Magnesium (Mg), zinc (Zn), beryllium (Be), calcium (Ca), strontium (Sr), barium (Ba) or the like may be used as p-type impurities.

Two kinds of Group III nitride compound semiconductor layers may be laminated so that the laminate can be used as the scintillator (hetero structure). In an embodiment, a laminate of GaN and InGaN is used as the scintillator. Three or more kinds of Group III nitride compound semiconductor layers may be laminated so that the laminate can be used as the scintillator.

The shape of the scintillator is not limited to the layer structure. That is, any shape may be used as the shape of the scintillator. For example, a bulk-shaped Group III nitride compound semiconductor can be used.

Such a Group III nitride compound semiconductor is chemically stable and easy to be processed into any shape as well as it is excellent in mechanical characteristic. Furthermore, as will be described later in Embodiment, the Group III nitride compound semiconductor emits intensive fluorescence at the ordinary temperature when irradiated with radiation.

The method for forming the Group III nitride compound semiconductor layer is not particularly limited. For example, the Group III nitride compound semiconductor layer can be formed on a substrate by a known method such as a metal organic chemical vapor deposition method (MOCVD method), a molecular beam epitaxy method (MBE method), a halide vapor phase epitaxy method (HVPE method), a sputtering method, or an ion-plating method.

Examples of the material of the substrate include sapphire, gallium nitride, spinel, silicon, silicon carbide, zinc oxide, gallium phosphide, gallium arsenide, magnesium oxide, and manganese oxide. Especially, a sapphire substrate is preferably used. When the sapphire substrate is used, a face a or c of the sapphire substrate is preferably used for the purpose of growing a Group III nitride compound semiconductor layer with good crystallinity.

A buffer layer may be provided between the substrate and the crystal layer of the Group III nitride compound semiconductor. The buffer layer is provided for improving the crystallinity of the Group III nitride compound semiconductor grown on the buffer layer. The buffer layer can be made of a Group III nitride compound semiconductor such as AlN, InN, GaN, AlGaN, InGaN, or AlInGaN.

When the Group III nitride compound semiconductor layer formed on the substrate in this manner is used as the scintillator, an existing process apparatus for forming a Group III nitride compound semiconductor layer can be applied as it is. Accordingly, the scintillator can be produced at low production cost.

Because the function of the scintillator can be fulfilled when the Group III nitride compound semiconductor layer is present, the substrate and the buffer layer may be removed after the formation of the Group III nitride compound semiconductor layer. In this case, the influence of fluorescence emitted from the substrate can be eliminated.

An embodiment of the invention will be described below.

FIG. 1 shows the configuration of a scintillator 1 according to this embodiment. Specifications of respective layers are as follows.

| Layer | Composition | Thickness |
|---|---|---|
| Second semiconductor layer 14 | $In_{0.25}Ga_{0.75}N$ | 3 nm |
| First semiconductor layer 13 | GaN | 2 μm |
| Buffer layer 12 | AlN | 2 nm |
| Substrate 11 | sapphire | 100 μm |

A GaN layer 13 is formed on a substrate 11 through a buffer layer 12. Although a sapphire substrate is used as the substrate 11, the material of the substrate 11 is not limited thereto. For example, sapphire, spinel, silicon, silicon carbide, zinc oxide, gallium phosphide, gallium arsenide, magnesium oxide, manganese oxide, zirconium boride, or Group III nitride compound semiconductor single crystal may be used as the material of the substrate 11. Although the buffer layer is formed out of AlN by an MOCVD method, the material and method for forming the buffer layer are not limited thereto. For example, GaN, InN, AlGaN, InGaN, or AlInGaN may be used as the material of the buffer layer. As the method for producing the buffer layer, for example, there may be used an MBE method, an HVPE method, a sputtering method, or an ion-plating method. When a Group III nitride compound semiconductor is used as the material of the substrate 11, the buffer layer can be dispensed with.

In addition, the substrate and the buffer layer may be removed after the formation of the semiconductor layers as occasion demands. This is because the influence of fluorescence emitted from the substrate can be eliminated.

The first semiconductor layer 13 of GaN and the second semiconductor layer 14 of InGaN are formed successively on the buffer layer 12 by an MOCVD method.

The first semiconductor layer 13 may be made of another material such as AlN, InN, AlGaN, InGaN, or AlInGaN than GaN. The second semiconductor layer 14 may be made of another material such as GaN, AlN, InN, AlGaN, or AlInGaN than InGaN.

Figure 2:
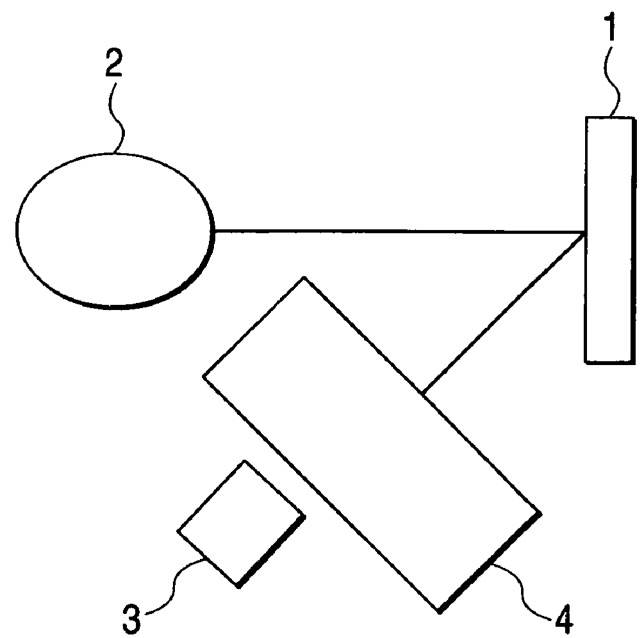
FIG. 2 shows an experimental apparatus for evaluating the scintillator according to the embodiment.

FIG. 2 shows an apparatus for evaluating the characteristic of the scintillator 1. The scintillator 1 shown in FIG. 1 is irradiated with radiation emitted from a Cu—K α-ray source 2 (200 W) in this apparatus. Fluorescence emitted from the scintillator 1 is made to pass through a spectroscope 4 (made by Carl Zeiss) so that only light at a predetermined wavelength reaches a photomultiplier tube 3 (made by Hamamatsu Photonics K.K.). The light is amplified and detected by the photomultiplier tube 3.

Figure 3:
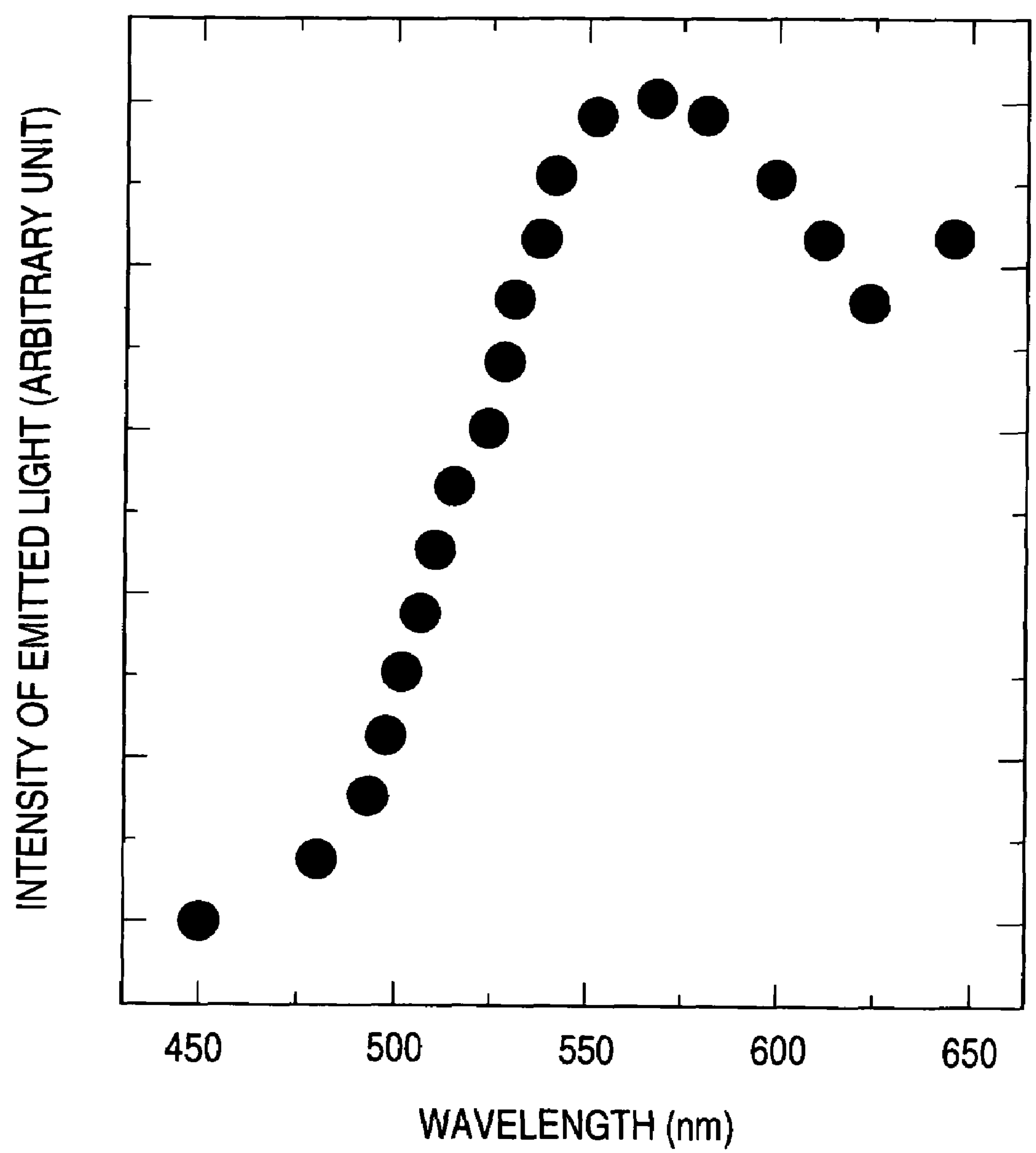
FIG. 3 shows the wavelength of fluorescence emitted from the scintillator according to the embodiment.

FIG. 3 shows results of the detection.

In FIG. 3, a peak at a wavelength near 560 nm is regarded as being caused by the second semiconductor layer 14 of InGaN. The life of light at this wavelength is about 250 ns. In FIG. 3, a spectrum at a wavelength longer than 650 nm is observed. This spectrum is caused by the sapphire substrate. When the sapphire substrate is removed as described above, fluorescence in this region can be removed. Alternatively, when the total thickness of the Group III nitride compound semiconductor layers laminated on the substrate is made about 100 μm, fluorescence in this region can be also removed.

It is however necessary to keep the crystallinity of the Group III nitride compound semiconductors good in order to absorb radiation such as X-rays sufficiently to generate intensive scintillation. From this point of view, there is preferred a structure formed in such a manner that a so-called single or multiple quantum well structure in which a GaN layer having a thickness of several μm to tens of μm is sandwiched between InGaN layers each having a thickness of several nm to tens of nm is repeated by several times or tens of times. In this structure, high scintillation efficiency can be achieved because carrier excited by radiation mainly absorbed to the GaN layer flows into the InGaN well layer as well as the influence of the substrate can be prevented.

The system shown in FIG. 2 is installed in an opened laboratory. Results shown in FIG. 3 can be obtained repeatedly without any attention to temperature and humidity.

It is obvious from the results shown in FIG. 3 that the Group III nitride compound semiconductor produced to develop a scintillator now is suitable for the scintillator because the Group III nitride compound semiconductor has the center of light emission relatively intensive in localization even at the room temperature, as the origin of light emission, compared with the related-art alkali halide material.

Figure 4:
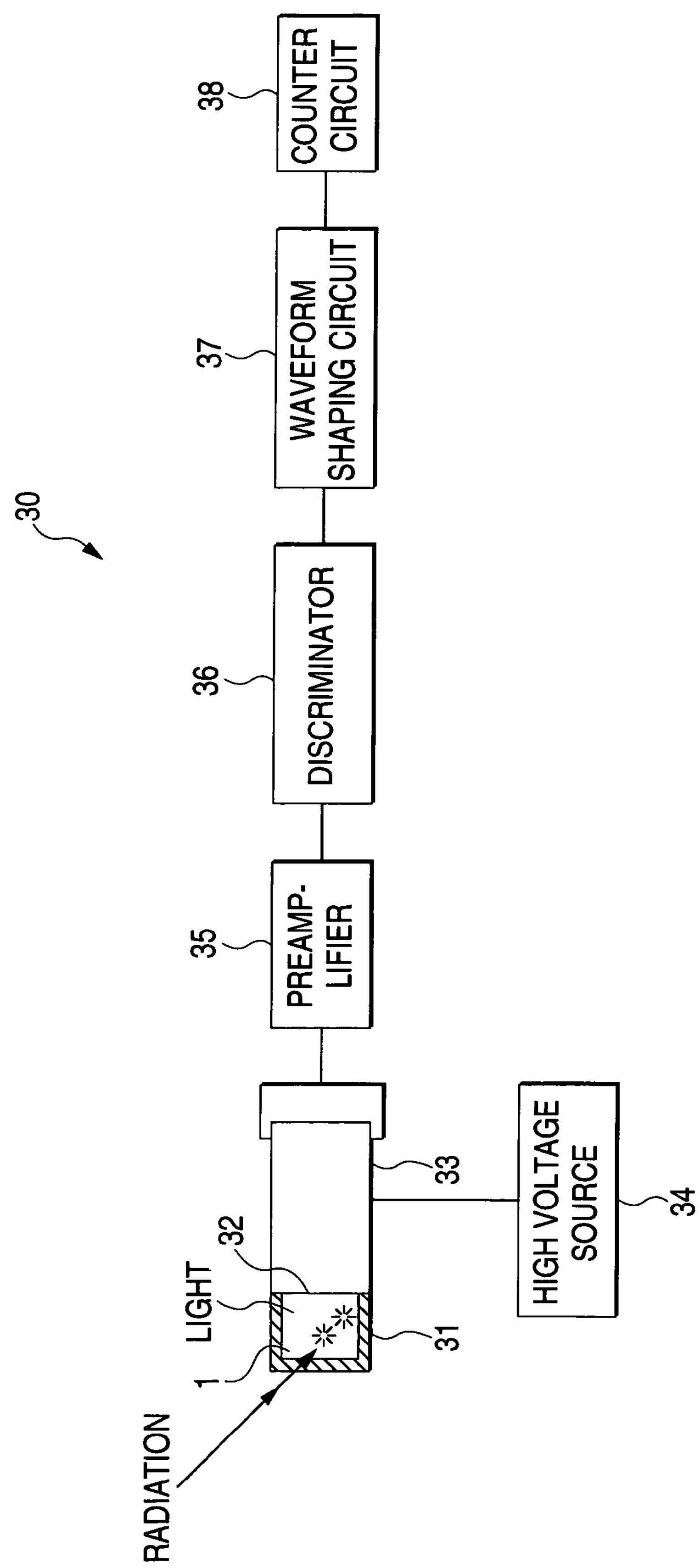
FIG. 4 is a block diagram showing the configuration of a scintillation counter including the scintillator according to the embodiment.

FIG. 4 shows an example of a scintillation counter 30 in which the scintillator 1 shown in FIG. 1 is incorporated. When radiation is incident on the scintillator 1, the scintillator 1 generates fluorescence (flash light) having a short life. The flash light is reflected by a reflector 31. The reflected light collides with a photoelectric surface 32 of a photomultiplier tube 33, so that photoelectrons are emitted from the photoelectric surface 32. The reference numeral 34 designates a high voltage source for the photomultiplier tube 33. In the photomultiplier tube 33, the photoelectrons are multiplied to about $10^6$ times. The output pulses of the photomultiplier tube 33 are further amplified by a preamplifier 35. The waveform of the pulses is shaped by a discriminator 36 and a waveform shaping circuit 37. The pulses are counted by a counter circuit 38. The count corresponds to the amount of radiation.

The scintillator according to the invention includes Group III nitride compound semiconductors as main constituent members. The Group III nitride compound semiconductors have the center of intensive light emission because they are relatively high in localization with respect to radiation even at the room temperature. Furthermore, the Group III nitride compound semiconductors are excellent both in mechanical stability and in chemical stability. Accordingly, the Group III nitride compound semiconductors are suitable for the material of the scintillator. In addition, because the Group III nitride compound semiconductor scintillator is mainly produced by growth of a thin film, the scintillator can be effectively applied to X-ray imaging when the scintillator is combined with an image sensor such as CCD.

The invention is not limited to the description of the mode for carrying out the invention and the description of the embodiment at all. Various modifications that can be easily conceived by those skilled in the art may be included in the invention without departing from the scope of claim.

What is claimed is:

1. A scintillation counter including a scintillator comprising:

a Group III nitride compound semiconductor, wherein said scintillator is excited by radiation.

2. A scintillation counter according to claim 1, wherein said Group III nitride compound semiconductor includes a layer structure.

3. A scintillation counter according to claim 2, wherein a layer of said Group III nitride compound semiconductor is formed on a substrate.

4. A scintillation counter according to claim 3, wherein a buffer layer is formed between said substrate and said Group III nitride compound semiconductor layer.

5. A scintillation counter according to claim 2, wherein said Group III nitride compound semiconductor layer includes a hetero structure.

6. A scintillation counter according to claim 1, wherein said Group III nitride compound semiconductor comprises:

a layer that emits fluorescent light when irradiated by at least one of a CU-Kα-ray source, an X-ray source, and a γ-ray source.

7. A scintillation counter according to claim 1, wherein said Group III nitride compound semiconductor comprises:

a layered structure including a plurality of alternating GaN layers and InGaN layers.

8. A scintillation counter according to claim 1, further comprising:

a radiation source that irradiates at least a portion of said scintillator; and a light receiving unit that receives light emitted from said scintillator.

9. A scintillation counter according to claim 8, wherein said radiation source includes at least one of a CU-Kα-ray source, an X-ray source, and a γ-ray source.

10. A scintillation counter according to claim 8, wherein said light receiving unit comprises:

a light amplifying and detecting unit.

11. A scintillation counter according to claim 8, wherein said light receiving unit comprises:

a photomultiplier tube.

12. A scintillation counter according to claim 8, further comprising:

a spectroscope disposed between said scintillator and said light receiving unit, wherein said spectroscope prevents light of a predetermined wavelength from reaching the light receiving unit.

13. A scintillation counter according to claim 1, wherein said Group III nitride compound semiconductor comprises:

a layered structure including two kinds of Group III nitride compound semiconductor layers.

* * * * *